March 6, 1945.  L. E. LANGDON  2,370,974
METHOD OF TREATING SEWAGE OR OTHER WASTE MATERIAL
Filed Feb. 26, 1942  2 Sheets-Sheet 1
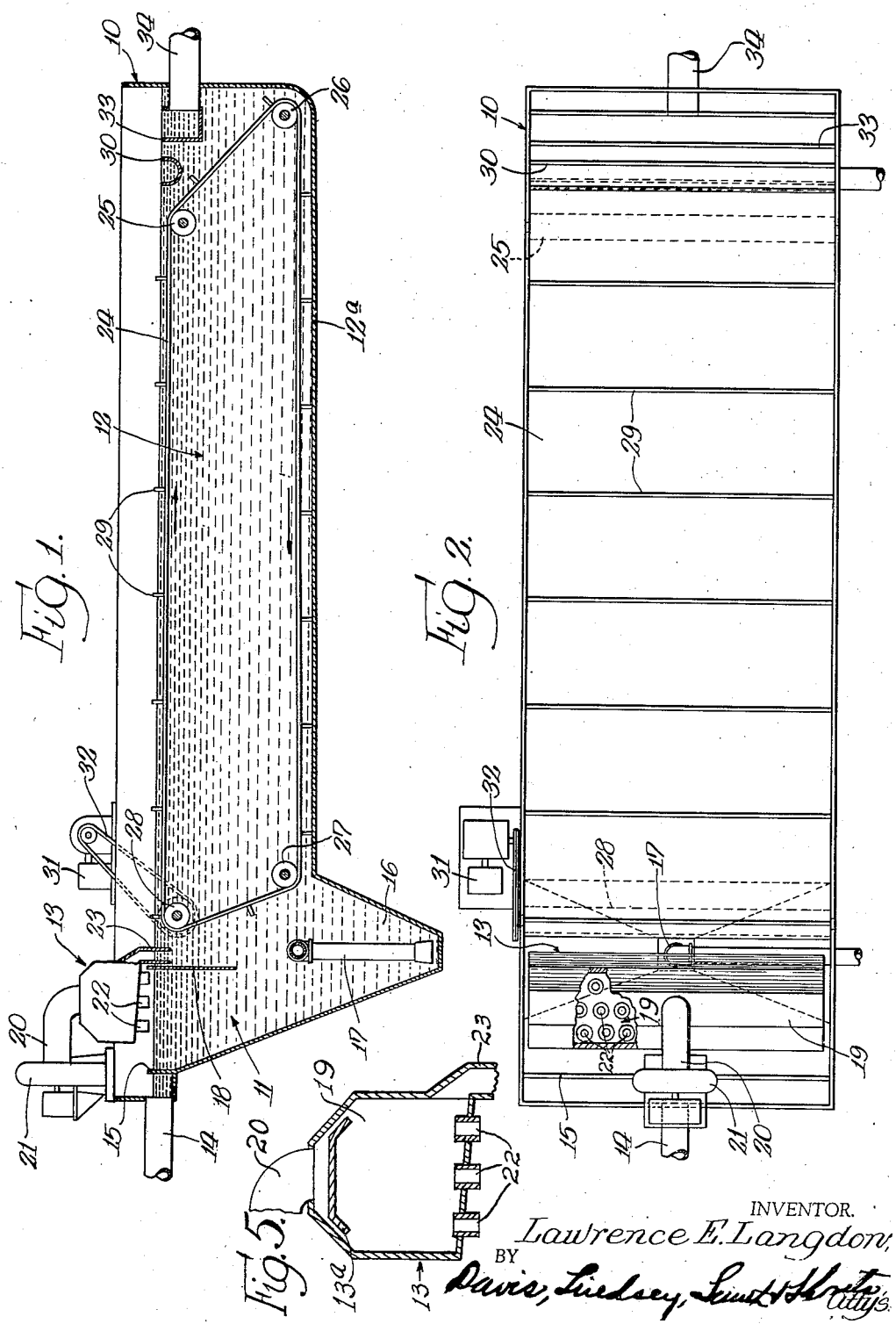
INVENTOR.
Lawrence E. Langdon,

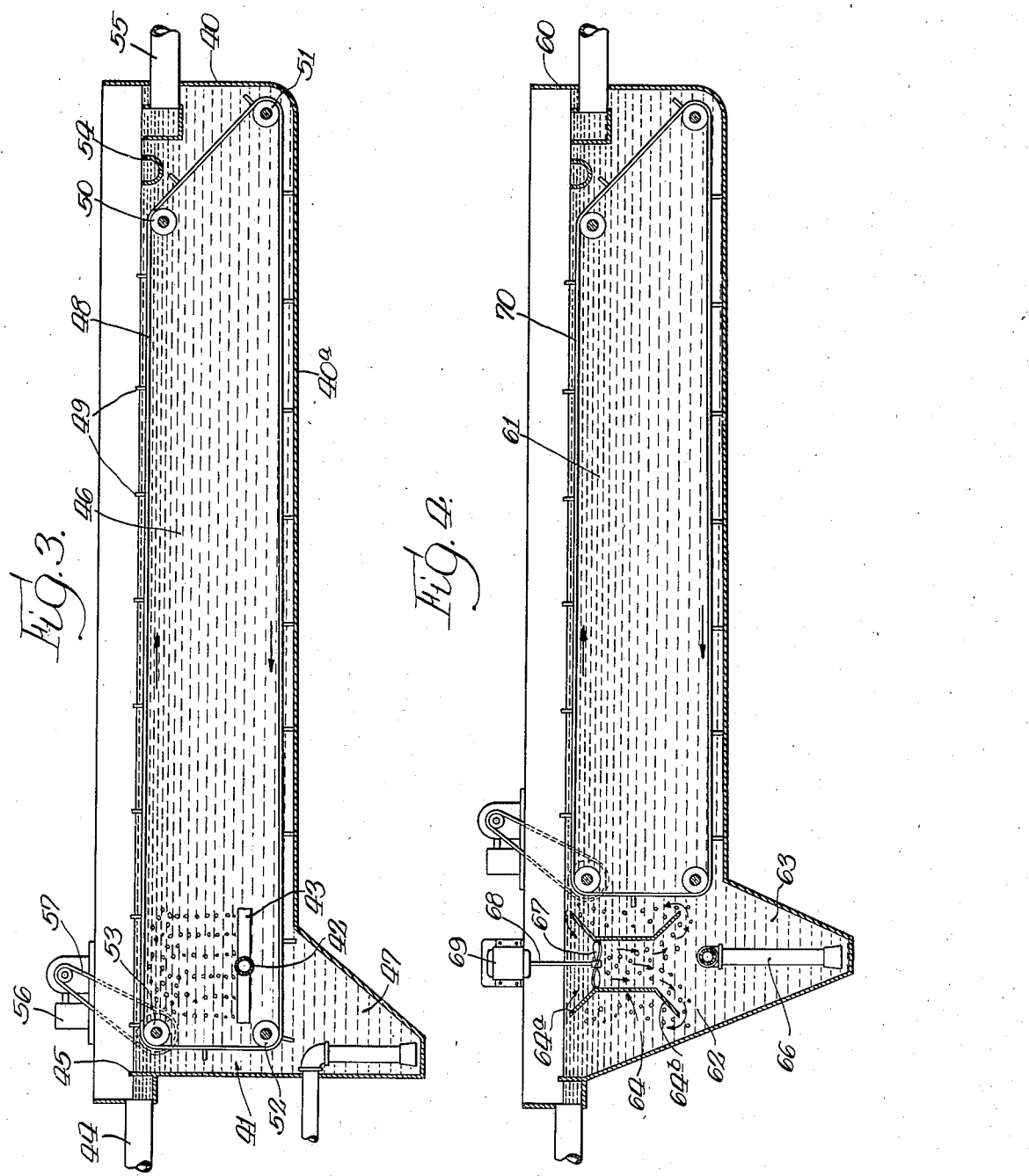

Patented Mar. 6, 1945

2,370,974

UNITED STATES PATENT OFFICE 2,370,974

METHOD OF TREATING SEWAGE OR OTHER WASTE MATERIAL

Lawrence E. Langdon, Wilmette, Ill., assignor to Pacific Flush Tank Company, Chicago, Ill., a corporation of Illinois Application February 26, 1942, Serial No. 432,387

2 Claims. (Cl. 210—3)

My invention relates generally to the treatment of sewage or other waste material and it has to do particularly with primary treatment of such material.

In the primary treatment of sewage or other waste material, it is essential that grease, oils, fats and similar substances which normally tend to float on water should be separated from the body of the material being treated so that the same will float to the surface where they may readily be removed. These floatable substances may be prevented from floating by adhering to or becoming entrained in suspended particles. Some of these substances may be attached to particles that are heavy enough to settle in the primary treatment zone so that they will be removed with the settled solids or sludge. Some are in colloidal suspension and cannot be settled out without aeration. Some may be attached to particles that are too light to settle but yet not light enough to float so that they will be carried out with the effluent of the primary treatment zone to a point of disposal or into a secondary treatment zone. Should the point of disposal in this instance be a stream, the grease and oils will rise to the surface of the stream, causing unsightliness or odors and inhibiting the ability of the stream to absorb oxygen from the atmosphere. If the greasy or oily substances are carried to a secondary treatment zone, they may there become separated from the particles to which they were attached in sufficient quantities to upset or seriously interfere with the process of secondary treatment. Also, some of these oily and greasy substances may adhere to or become entrained in suspended particles to such an extent as to cause appreciable quantities of suspended particles to float on the surface of the material in the primary treatment zone, as scum, thereby greatly increasing the labor of removing such floating material.

I am not aware of any means heretofore devised by which greasy, oily, fatty and the like substances in sewage material may be satisfactorily treated and removed prior to or in association with the primary treatment of sewage material. In some instances it has been customary to employ preaerating devices in tanks, basins, conduits or channels preceding the primary treatment zone, but this practice presents numerous difficulties. Such practice necessitates the maintenance, under conditions of fluctuating rates of incoming flows, of sufficient velocity or turbulence in the preaeration zones at all times to keep settleable materials in suspension until the sewage or waste material reaches the primary treatment zone. In such preaeration and agitation, grease, oils and other floatable substances may preliminarily be separated from the sewage material without adequate provision for their disposal. In some instances such separated floatable substances may be removed by hand ahead of the primary treatment zone, but this entails considerable difficulty from the standpoint of disposal and proper attention in the operation of the plant.

Also, for example, in the use of separate aerating basins or tanks ahead of the primary treatment zone, considerable difficulties are experienced due to the fact that some of the solids do necessarily settle in the bottom of the aeration tanks where they form pockets of septicity. These pockets of septicity naturally interfere with the operation of the unit in that these materials will accumulate eventually in such quantity that it is necessary to drain the aeration tanks and remove the same. If the preaeration takes place in open channels or conduits, it is likewise necessary to provide means for eliminating the sedimentation of materials in the channels or conduits under conditions of variation in rates of material flow.

The principal object of my invention is to provide for the separation of the oily, greasy, fatty and the like substances from the material subjected to primary treatment in such a manner as to obtain all of the advantages to be gained by separation of such substances without the objectionable features of prior practice hereinabove stated.

Another object of my invention is to provide for the separation of grease, oils, fats and other floatable substances by aeration directly in a primary treatment zone where the aerated material is subjected to an action of quiescent settling immediately following aeration so that full benefit of aeration from separation and other standpoints is fully attained.

A further object is to provide in a single primary treatment zone for the separation and flotation of the floatable substances, the ready removal of the floatable substances, the settling of the settleable solids and the removal of the same, and the separation and removal of clarified effluent freed to a maximum extent of both floatable and settleable materials, whereby an improved primary treatment is provided which necessarily affords improved secondary treatment.

Other objects of my invention are to eliminate the necessity of employing a separate tank or zone for preaeration purposes, thereby insuring a considerable saving in construction and operating costs; to provide for combined steps of aeration and primary sedimentation in a single zone without interference with each other; to insure maximum separation and removal of floatable materials and substances as well as the separation of dissolved or entrained gases, the flocculation or agglomeration of finely divided, dispersed and colloidal substances, the oxidizing to an insoluble form of substances of a soluble nature; and the introduction into the sewage or waste material of dissolved oxygen for freshening the sewage and partially treating the same.

Other objects and advantages will become obvious as this description progresses and by reference to the accompanying drawings, wherein—

Figure 1 is a sectional view, partially diagrammatic, of one form of structure which may well be employed in carrying out my invention;

Fig. 2 is a top plan view, partially in section, of the structure shown in Fig. 1;

Figs. 3 and 4 are views similar to Fig. 1 of other forms of structure that may be employed in carrying out my invention; and Fig. 5 is a sectional, diagrammatic view of the aerator shown in Fig. 1.

My invention involves primarily the flow of raw or untreated sewage to a primary treatment zone wherein such material is first subjected to aeration and then to quiescent settling. The aeration is accomplished by agitation of such violence as to secure the separation or release of floatable materials and substances from suspended particles, to secure the removal of gases as above stated, to produce flocculation or agglomeration of finely divided, dispersed or colloidal substances, to oxidize to an insoluble form substances of a soluble nature, and to introduce into the sewage or waste material dissolved oxygen for freshening the sewage. In the quiescent settling action that immediately follows aeration, the floatable material so separated floats to the top of the surface of the material being treated and the settleable solids settle to the bottom of the tank. Clarified effluent is discharged from the primary treatment zone for secondary treatment substantially free from objectionable fatty, oily and greasy substances or the like. The floatable material that rises to the surface of the settling zone is separately removed and discharged to a point of disposal, which may be a digestion tank or other suitable means. The settled solids are also removed from the point of settling to a collecting chamber from which they may be discharged to a point of disposal. The removal of floatable substances and settled solids is purposely accomplished by a single conveyor means. The solids-receiving chamber is connected not only to the settling portion of the primary treatment zone, but also to the inlet portion of such zone so that any settleable solids which tend to settle prior to or during aeration may find their way directly into such chamber.

The structure shown in Figs. 1 and 2 is well adapted for carrying out my invention. It includes a tank 10 which I may term the primary treatment tank and which constitutes the primary treatment zone. This tank is provided with an inlet section or chamber 11 and a settling section or chamber 12. An aerating device 13 is disposed between the inlet and settling chambers 11 and 12.

The tank 10 is provided with a raw sewage inlet conduit 14 for delivering raw sewage into the inlet chamber 11. A transversely extending weir plate 15 is disposed at the tank inlet so that sewage may be fed into the inlet chamber 11 without materially disturbing or agitating the material in such inlet chamber. The tank 10 is further provided with a solids-receiving chamber 16 which is located beneath the inlet chamber 11 and which is connected not only with the inlet chamber 11 but also with the settling chamber 12. With this arrangement, solids that tend to settle in the inlet chamber 11 of the tank will settle downwardly directly into the solids-receiving chamber 16 where they are disposed of by sludge removal or draw-off means 17 along with the solids received from the settling chamber 12. The sludge draw-off means 17 may be of any suitable and well known form. The inlet chamber 11 is separated from the settling chamber 12 by a laterally-disposed, vertically-extending baffle plate 18 which extends downwardly from a point above the surface of the material in the tank 10 and which, as will be explained, cooperates with the aerating device 13.

In further carrying out my invention, in the manner exemplified in Fig. 1, material from the inlet chamber 11 of the tank is violently agitated and aerated without disturbing the material in the settling chamber 12, where a quiescent settling action takes place. The agitation and aeration referred to are accomplished by the aerator 13 which is of the tuyère type and which is shown diagrammatically in Figs. 1, 2 and 5 of the drawings. This aerator 13 comprises an aerating chamber 19 connected at its upper end by a conduit 20 to an exhaust fan or pump 21. A plurality of vertically disposed tuyères 22 are mounted in the floor of the chamber 19, the upper open ends of which tuyères extend a short distance above the floor of the chamber 19. These tuyères also extend downwardly below the floor of the chamber 19 to a point a short distance above the surface of the material in the inlet chamber 11. The distance between the lower ends of the tuyères and the liquor may be varied, but I have found that excellent results are obtainable by locating the lower open ends of the tuyères from one-fourth of an inch to an inch above the material. The baffle plate 18 extends to a sufficient depth to confine the raw or untreated sewage or other waste material in the inlet chamber 11 in operative relation to the tuyères 22.

In the use of the aerator 13, the suction of the pump 21 draws air from the aerating chamber 19 to produce a vacuum equivalent to about three inches of water column in this chamber. This causes air to be drawn in through the tuyères 22 at a very high velocity, creating a vortex at the surface of the material and sucking up the material from the surface of the inlet chamber 11 through the tuyères 22 and discharging the material at high velocity into the aeration chamber 19. The air being drawn in through the tuyères in a swirling motion breaks up the material by the violent agitation into very fine particles, which, as will be well understood, produces a high degree of aeration.

The action within the aeration chamber 19 of completely breaking up the material into minute particles drawn into the chamber provides an effective aeration of the material by getting as much surface area of the material in contact with as much air as possible. As a result, by breaking up the sewage material into as small particles as possible, a maximum surface of the material is exposed to the air for aeration or oxygenation. Also, since the unit operates against only a vacuum of approximately three inches of water column, an economical method is had providing large volumes of air to assure an adequate aeration of the sewage. The large volume of air produced, provides ample velocities through the tuyères 22. For example, air velocities in excess of 1500 feet per minute may be employed and the same, if necessary, may approach 3000 feet per minute, to secure a complete atomization of the sewage material.

The broken up particles of material are carried vertically a short distance where the velocity of air flow is reduced due to the large area of the aerating chamber 19, to a point where the velocity is no longer sufficient to carry these particles vertically upwards. A baffle plate 13ª is located in the upper portion of the chamber 19 to deflect particles that tend to be drawn into the pump. The aerated particles of material then settle back down and are collected on the sloping bottom plate of the aerating chamber and allowed to flow out of the aerating chamber by gravity through a drain conduit 23 leading from the aerating chamber 19 into the quiescent settling chamber 12 on the rear side of the baffle plate 18. In the aerating action just explained, a large part of the gases entrained in the aerated material is released therefrom, colloidal material is broken down into settleable form so that when it is delivered to the settling chamber 12 such material will readily settle. This aeration action also is such as to separate oily, greasy, fatty and other floatable substances from the solids in the material so that when the aerated material is delivered to the settling chamber 12, these materials readily float to the surface of the material in such chamber. This aerating action also tends to produce the other aeration results heretofore more fully stated.

Removal of both the floatable substances and solids which collect in the settling chamber 12 is accomplished in the following manner: The chamber 12 is provided with an endless conveyor 24 supported by suitable sprockets 25, 26, 27 and 28 so located at the upper and lower end portions of the chamber 12 that the conveyor 24 moves along in close proximity to the bottom 12ª of the chamber and the upper surface of the material therein. The conveyor 24 is provided with laterally extending and, preferably, equally spaced paddle-like scraper members 29 which are of sufficient depth to sweep over the chamber bottom 12ª and remove solids therefrom and also to sweep along and above the upper surface of the material in the chamber 12 and remove the floatable substances thereon. The lower forward end of the conveyor at sprocket 27 is so located as to discharge solids swept along the bottom by the conveyor paddles 29 directly into the solids-receiving chamber 16. The upper rear end of the conveyor at sprocket 25 is located in close proximity to a transverse trough member 30 so that the floatable substances swept along by the conveyor paddles at the top of the chamber 12 are discharged into such trough. The trough 30 is connected in any suitable manner to a point of disposal such as a digester (not shown). The conveyor 24 is driven from an electric or other motive means 31 through a sprocket drive 32 suitably connected to the conveyor sprocket 28.

The tank 10 is provided rearwardly of the conveyor 24 with a clarified effluent weir-type draw-off 33 to which is connected an effluent discharge conduit 34 which leads to a point of secondary treatment (not shown) or other point of disposal.

The structure shown in Fig. 3 may also be employed, if desired, in carrying out my invention. The structure of Fig. 3 is similar to that of Figs. 1 and 2 except that the aeration at the inlet end of the primary treatment tank 40 is accomplished by a diffused air type of aerating means. Specifically, the inlet chamber 41 of the tank 40 is provided with an air header conduit 42 to which are connected a plurality of laterally spaced branches 43 from which air under pressure is discharged into and upwardly through the material, as illustrated. The air under pressure may be supplied by any suitable compressor means (not shown). In the use of this form of aerator the raw or untreated sewage is admitted to the tank 40 through an inlet conduit 44, a transversely extending weir plate 45, similar to the weir of Fig. 1, being provided near the inlet. The aerator 42, 43 aerates the material in the tank inlet chamber 41 causing the floatable materials to separate from the settleable solids, as explained in connection with the form of Fig. 1. The separated materials pass rearwardly in the tank 40 into a chamber 46 where quiescent settling action takes places, the floatable materials rising to the top surface of the material and the settleable solids settling to the bottom 40ª of the tank. Some of the solids of the incoming raw sewage will settle in the inlet chamber 41 of the tank, as explained in connection with Fig. 1, and these solids pass downwardly into a solids-receiving chamber 47 which is located directly beneath the inlet section. This solids-receiving chamber 47 is also directly connected to the settling section 46 as in the previously described form.

The settled solids and floatable substances are removed by an endless conveyor 48 having paddle-like scraper members 49 supported by a plurality of sprockets 50, 51, 52 and 53, as in Fig. 1. This conveyor differs from the conveyor 24 of Fig. 1 in that its forward end passes in close proximity to the forward end of the tank 40 and passes around the aerating means. The purpose of this is to provide for movement of the conveyor paddles 49 over the surface of the material above the aerating means to insure removal of floatable substances that may rise to the surface at that point. The tank 40 is further provided with a trough 54 for collecting and discharging the floatable substances. It also has a clarified effluent draw-off 55. The conveyor is driven by suitable power means 56 through a sprocket drive 57 connected with the conveyor sprocket 53. Otherwise, the construction and operation of this form is the same as that of Fig. 1.

The structure illustrated in Fig. 4 is similar to that of Fig. 1 except that a downdraft type of mechanical aerator instead of the tuyère type is employed. Specifically, in this form I employ a tank 60 having a settling chamber 61 and an inlet chamber 62. Beneath the inlet chamber 62 there is a solids-receiving chamber 63 which is connected to both the settling chamber and the inlet chamber.

The aerating means (Fig. 4) is disposed in the inlet chamber 62 and it includes a vertically extending, relatively large tubular member or draft tube 64 having flared or funnel-shaped ends 64ª and 64ᵇ. The upper flared end 64ª of this tube projects in close proximity to the upper surface of the material in the tank 60 while its lower end terminates slightly above the sludge-draw-off means 66 leading from the solids-receiving chamber 63. A propeller 67 is located in the tube 64 adjacent its upper flared end, which propeller is driven through a shaft 68 by an electric or other motor 69. The propeller 67 is driven rotatably in a direction to draw the material from the surface of the inlet chamber 62 downwardly through the draft tube 64, during which action the material passing through the tube 64 is agitated and aerated in a manner well known. In this particular form, since the material is drawn from the surface of the inlet chamber 62, the tendency for floatable substances to collect in the receiving chamber is prevented. The material agitated in this manner passes from the lower end of the tube 64 into the tank chamber 61 where a quiescent settling action takes place in a manner already described. In this chamber the floatable substances arise to the surface of the material in the chamber 61 and the settleable solids settle to the bottom. These substances are removed by an endless conveyor 70, like the conveyor 24 of Fig. 1. Otherwise, the construction and operation of this form is the same as that of Fig. 1. If desired, the direction of rotation of the propeller may be reversed. This will reverse the direction of the flow in the draft tube 64. In this case the propeller 67 may be located at the lower end of the draft tube 64. By so locating the propeller, aeration will be accomplished in a manner well known and the advantages of my invention in respect to the separation of the floatable substances will be attained. In this latter instance, if desired, the endless conveyor 70 may extend around the aerator, as in Fig. 3.

I believe that the operation and advantages of my invention will be well understood from the foregoing description. In the use of my invention, a more effective primary treatment is accomplished and the subsequent handling and treatment of the sewage material is greatly improved.

I claim:

1. The method of subjecting raw, untreated sewage to primary treatment in a single treating unit which includes the steps of feeding the raw, untreated sewage material into the upper part of an inlet zone wherein settling solids can pass by gravity to a solids receiving zone at the bottom of said inlet zone, subjecting the sewage material so fed and before it is passed beyond said inlet zone to aeration of such character as to free floatable substances from the suspended solids contained in said sewage material, passing the aerated sewage material directly after aeration to a zone of quiescent settling wherein the floatable substances rise to the top of such zone and the settleable solids settle to the bottom thereof, collecting and discharging settled solids from the quiescent zone into said solids receiving zone, discharging the solids collected in said solids receiving zone, collecting the floatable substances from and along the surface of said settling zone, discharging the collected floatable substances and collecting and discharging clarified effluent from said settling zone.

2. The method of primarily treating sewage or other waste material in a single treatment zone which comprises the steps of feeding the sewage material to the upper part of an inlet zone, collecting settling solids from said inlet zone in a solids receiving zone at the bottom of said inlet zone, subjecting the unsettled sewage material of said inlet zone to an agitation and aeration action sufficient to free floatable substances from suspended solids in said sewage material, passing the aerated sewage material directly from the point of aeration to a zone of quiescent settling wherein the settleable solids settle to the bottom thereof and the floatable substances rise to the surface of the sewage material, collecting and discharging the settled solids from said quiescent settling zone into said solids receiving zone, collecting said floatable substances from said quiescent settling zone and moving the same to a point of discharge, discharging said collected floatable substances to a point of disposal, and discharging the contents of said solids receiving zone to a point of disposal, all said zones being disposed in directly associated relation in respect to each other.

LAWRENCE E. LANGDON.